(12) United States Patent
Hsieh (10) Patent No.: US 8,021,040 B2
(45) Date of Patent: Sep. 20, 2011

(54) DISPOSABLE THERMOMETER PROBE SHEATH AND FABRICATION METHOD THEREOF

(75) Inventor: Chih-Wei Hsieh, Hsinchu (TW)

(73) Assignee: Actherm Inc., Hsinchu (TW)

( * ) Notice: Subject to any disclaimer, the term of this patent is extended or adjusted under 35 U.S.C. 154(b) by 0 days.

(21) Appl. No.: 12/911,225

(22) Filed: Oct. 25, 2010

(65) Prior Publication Data

US 2011/0034310 A1 Feb. 10, 2011

Related U.S. Application Data (63) Continuation of application No. 11/892,236, filed on Aug. 21, 2007, now Pat. No. 7,845,850.

(30) Foreign Application Priority Data

Jun. 22, 2007 (TW) .............................. 96210094 U (51) Int. Cl.
G01K 1/12 (2006.01)
(52) U.S. Cl. .......................... 374/158; 374/209; 600/121
(58) Field of Classification Search .................. 374/100, 374/120, 121, 158, 209, 163, 183, 185, 178, 374/179; 73/866.5; 600/474, 121; 116/216
See application file for complete search history.

(56) References Cited

U.S. PATENT DOCUMENTS

| | | | |
|---|---|---|---|
| 3,190,436 A | 6/1965 | Diamant | |
| 4,164,285 A | 8/1979 | Dorman | |
| 5,458,132 A * | 10/1995 | Yabe et al. | 600/121 |
| 6,371,639 B1 * | 4/2002 | Huang | 374/158 |
| 7,850,602 B2 * | 12/2010 | Humble et al. | 600/124 |

FOREIGN PATENT DOCUMENTS

| | | |
|---|---|---|
| GB | 819767 | 9/1959 |
| SE | 451452 | 1/1988 |
| TW | 311174 | 7/1997 |
| TW | 343736 | 10/1998 |
| TW | 373067 | 11/1999 |

* cited by examiner

*Primary Examiner* — Gail Verbitsky
(74) *Attorney, Agent, or Firm* — Ming Chow; Sinorica, LLC (57) ABSTRACT

A disposable thermometer probe sheath includes a bottom piece and a plastic cover film sealed onto the bottom piece. The plastic cover film comprising an upper plastic sheet film and a lower plastic sheet film, each of which has a front edge provided with an opening, a rear edge provided with a tip, and a sealed peripheral edge except for the opening, so as to receive a thermometer probe. The plastic cover film is made of a flexible and deformable material, while the plastic cover film is provided with two notches respectively formed on two side edges adjacent to the tip. The upper plastic sheet film is provided with a first flap attached to the opening thereof, while the lower plastic sheet film is provided with a second flap attached to the opening. When the thermometer probe is inserted into the plastic cover film, the notches are tightly engaged with the thermometer probe. When separating the thermometer probe from the plastic cover film, one of the upper plastic sheet film and the lower plastic sheet film of the plastic cover film is torn from the opening thereof along a longitudinal direction of the plastic cover film under the assistance of the engagement between the two notches and the thermometer probe, and then the one of the upper plastic sheet film and the lower plastic sheet film will be overturned from the opening toward the tip of the plastic cover film, so that the thermometer probe is separated from the plastic cover film.

8 Claims, 7 Drawing Sheets

DISPOSABLE THERMOMETER PROBE SHEATH AND FABRICATION METHOD THEREOF

The current application is a continuation application of, and claims a priority to Ser. No. 11/892,236 filed on Aug. 21, 2007 now U.S. Pat. No 7,845,850.

FIELD OF THE INVENTION

The present invention relates to a disposable thermometer probe sheath and a fabrication method thereof, and more particularly to a disposable thermometer probe sheath which will be discarded after use, wherein possible infections caused by the used thermometer probe sheath can be prevented.

BACKGROUND OF THE INVENTION

Figure 1A:
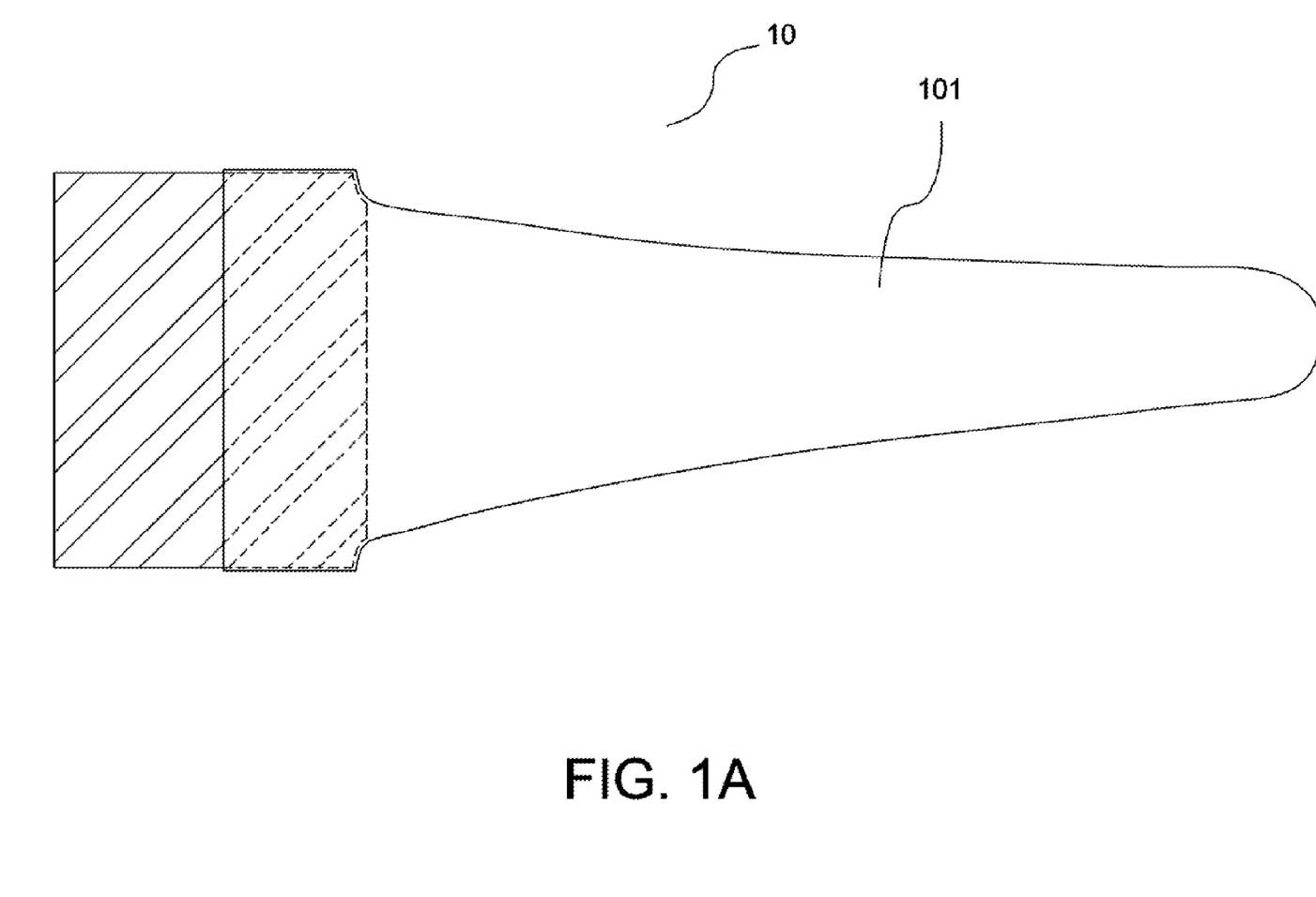
FIG. 1A is an assembled view of a conventional disposable thermometer probe sheath.
Figure 1B:
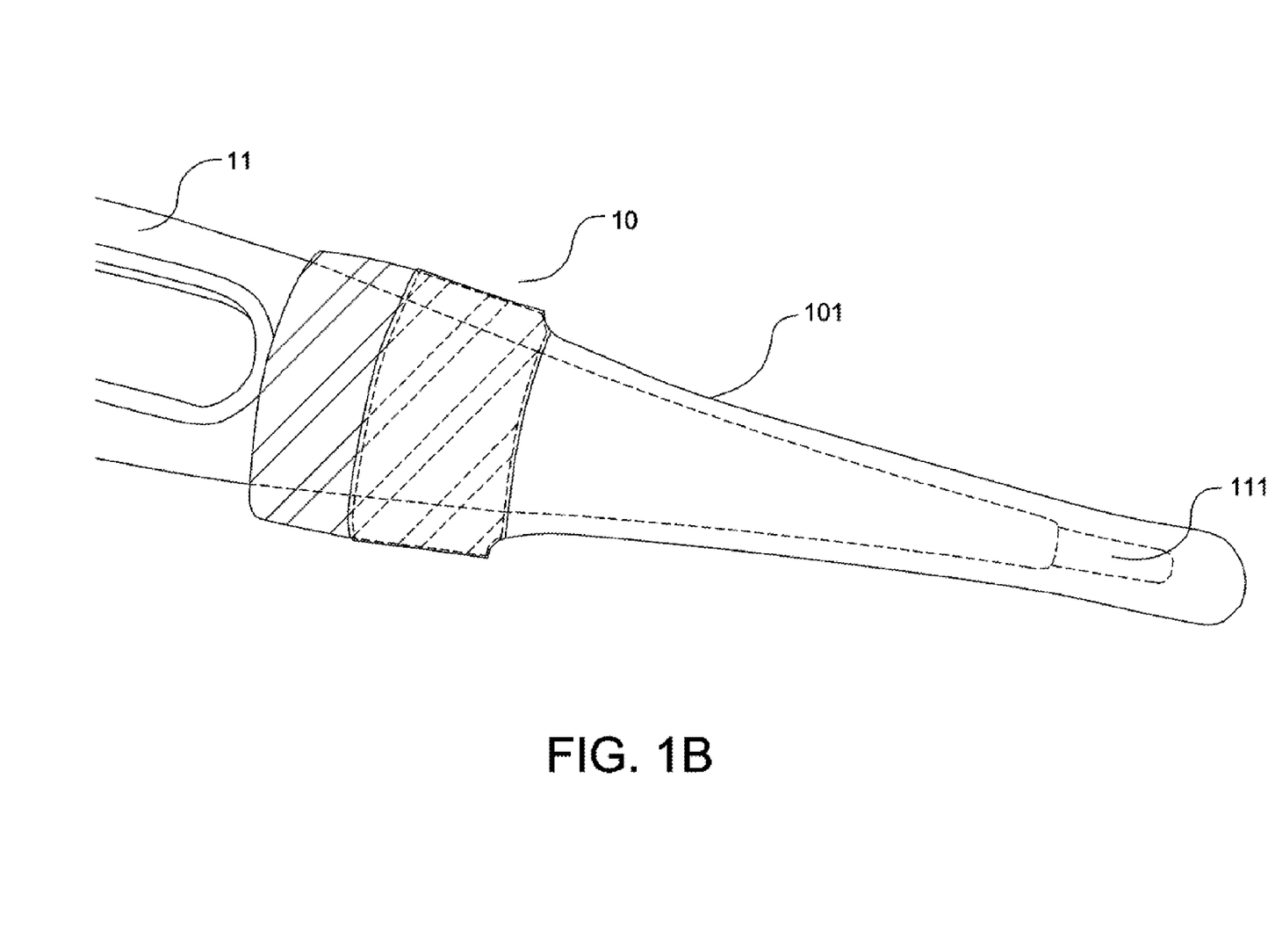
FIG. 1B is an operational view of the conventional disposable thermometer probe sheath which receives a thermometer probe.

Some known prior arts, such as U.S. Pat. No. 4,164,285, TW Patent No. 373067, No. 343736, and No. 311174, respectively disclose a disposable sheath for accommodating a thermometer probe. Referring now to FIGS. 1A and 1B, a conventional disposable sheath 10 has an opening portion (unlabeled) for receiving a probe 111 of a thermometer 11. After the disposable sheath 10 and the thermometer 11 are used to detect one's body temperature, the disposable sheath 10 will be separated from the thermometer 11 for discarding. However, an outer plastic film 101 of the disposable sheath 10 will be directly exposed out of the atmosphere during the separating operation, so as to cause a risk of medical hygiene. For example, when a medical staff member uses the thermometer 11 covered with the disposable sheath 10 to detect a patient's body temperature, the outer plastic film 101 of the disposable sheath 10 may be contaminated by the patient's secretion, resulting in increasing the contamination risk of the medical staff member. In another aspect, the material and the tip shape of the outer plastic film 101 of the disposable sheath 10 generally play an important role in the contact tightness between the disposable sheath 10 and the probe 111 of the thermometer 11.

Therefore, the conventional disposable sheath of the thermometer apparently causes the usage inconvenience and the risk trouble of users and medical staff. As a result, it is an important issue for related manufacturers to think how to provide a convenient and efficient thermometer probe sheath for preventing the medical staff from being in contact with the contaminated outer plastic film of the disposable sheath

SUMMARY OF THE INVENTION

To solve the foregoing problems, the present invention provides a disposable thermometer probe sheath and a fabrication method thereof, wherein a probe sheath 20 comprises a bottom piece 22 and a plastic cover film 23 which is sealed onto the bottom piece 22. The plastic cover film 23 includes an upper plastic sheet film 231 and a lower plastic sheet film 232, each of which has a front edge provided with an opening 233 and a rear edge provided with a tip 234. The upper plastic sheet film 231 has its peripheral edge sealed around the peripheral edge of the lower plastic sheet film 232 except for the opening 233 so as to receive a thermometer probe 21 in the plastic cover film 23. It is characterized in that the plastic cover film 23 is made of a flexible, deformable and nonfragile material, such as low density polyethylene (LDPE), linear low density polyethylene (LLDPE), or ultra low density polyethylene (ULDPE), while the plastic cover film 23 is provided with two notches 235 respectively formed on two side edges adjacent to the tip 234. When the thermometer probe 21 is inserted into the plastic cover film 23, the notches 235 are plastically deformed and tightly engaged with the thermometer probe 21. The upper plastic sheet film 231 is provided with a first flap 24 attached to the opening 233 thereof, while the lower plastic sheet film 232 is provided with a second flap 25 attached to the opening 233. When separating the thermometer probe 21 from the plastic cover film 23, a user can tear one of the upper plastic sheet film 231 and the lower plastic sheet film 232 of the plastic cover film 23 from one of the first flap 24 and the second flap 25 along a longitudinal direction of the plastic cover film 23, and then the one of the upper plastic sheet film 231 and the lower plastic sheet film 232 will be plastically deformed and overturned from the opening 233 toward the tip 234 of the plastic cover film 23, so that the thermometer probe 21 will be separated from the plastic cover film 23.

A primary object of the present invention is to provide a disposable thermometer probe sheath, which can be tightly engaged with a thermometer probe inserted therein, so as to prevent the thermometer probe from being detached therefrom.

A secondary object of the present invention is to provide a disposable thermometer probe sheath, wherein when the thermometer probe is separated from the sheath, the sheath is plastically deformed and overturned to be separated from the thermometer probe, so as to lower the risk of contacting with a plastic cover film of the sheath.

A third object of the present invention is to provide a disposable thermometer probe sheath, wherein the thermometer probe can be smoothly inserted into the sheath.

A fourth object of the present invention is to provide a disposable thermometer probe sheath, wherein when the thermometer probe is inserted into the sheath, the two flaps having different colors or dimensions and provided to the sheath cause a visional contrast to enhance the operation convenience.

A fifth object of the present invention is to provide a fabrication method of a disposable thermometer probe sheath, which can be tightly engaged with a thermometer probe inserted therein, so as to prevent the thermometer probe from being detached therefrom.

A sixth object of the present invention is to provide a fabrication method of a disposable thermometer probe sheath, wherein when the thermometer probe is separated from the sheath, the sheath is plastically deformed and overturned to be separated from the thermometer probe, so as to lower the risk of contacting with a plastic cover film of the sheath.

A seventh object of the present invention is to provide a fabrication method of a disposable thermometer probe sheath, wherein the thermometer probe can be smoothly inserted into the sheath.

An eighth object of the present invention is to provide a fabrication method of a disposable thermometer probe sheath, wherein when the thermometer probe is inserted into the sheath, the two flaps having different colors or dimensions and provided to the sheath cause a visional contrast to enhance the operation convenience.

A ninth object of the present invention is to provide a fabrication method of a disposable thermometer probe sheath, which is advantageous to carry out a continuous volume production of the disposable thermometer probe sheath.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention relates to a disposable thermometer probe sheath, which uses a thermometer principle, wherein those skilled in the art can apparently understand the thermometer principle, so that the detailed description thereof will be omitted hereinafter. Meanwhile, the structure and the technical means adopted by the present invention can be best understood by referring to the following detailed description of the preferred embodiments and the accompanying drawings which are not (and needs not be) illustrated according to actual sizes.

Figure 2A:
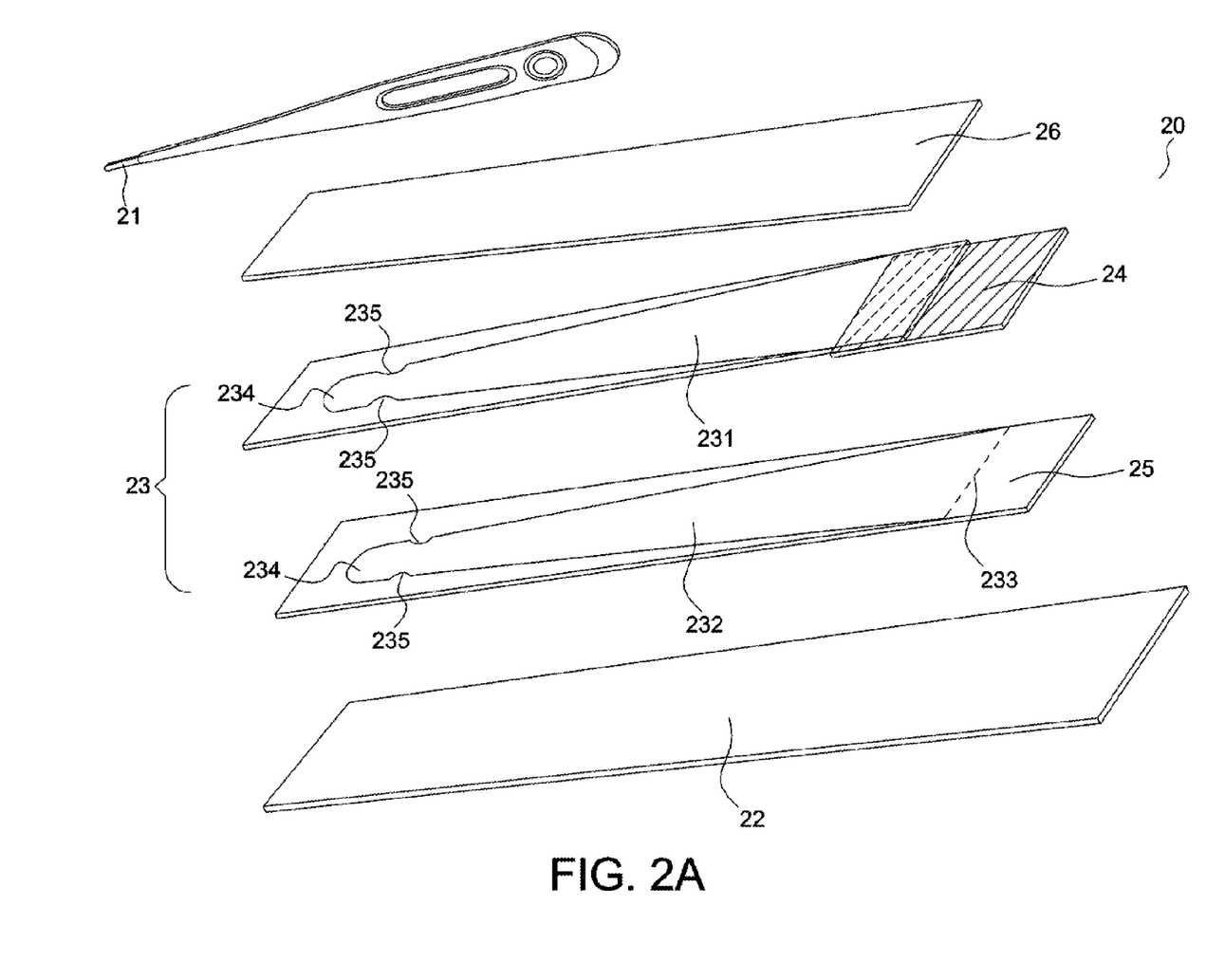
FIG. 2A is an exploded perspective view of a disposable thermometer probe sheath provided with two notches according to a preferred embodiment of the present invention.
Figure 2B:
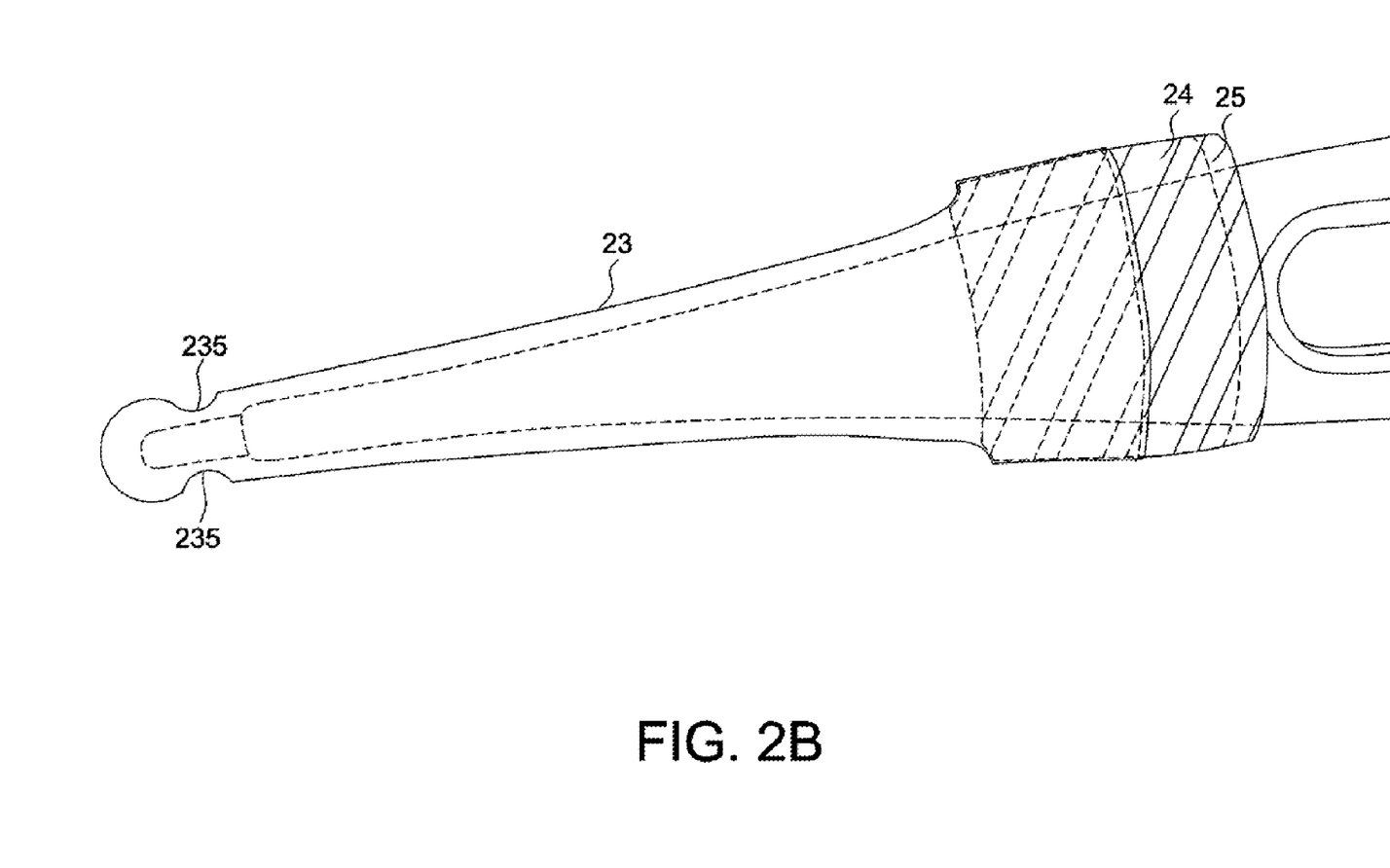
FIG. 2B is an operational view of the disposable thermometer probe sheath provided with the two notches engaged with a thermometer probe according to the preferred embodiment of the present invention.

Referring now to FIG. 2A, a disposable thermometer probe sheath according to a first preferred embodiment of the present invention is illustrated. As shown, the disposable thermometer probe sheath designated by numeral 20 is applied to a thermometer probe 21, and comprises a bottom piece 22 and a plastic cover film 23 which is sealed onto the bottom piece 22. The plastic cover film 23 composed of an upper plastic sheet film 231 and a lower plastic sheet film 232 has on its front edge an opening 233 and on its rear edge a tip 234. In addition, the upper plastic sheet film 231 has its peripheral edge sealed around the peripheral edge of the lower plastic sheet film 232 except for the opening 233 so as to receive a thermometer probe 21 in the plastic cover film 23, as shown in FIG. 2B. An inner surface of the plastic cover film 23 is preferably coated with an ointment, so that the thermometer probe 21 can be smoothly inserted into the plastic cover film 23. Especially, the plastic cover film 23 is provided with two notches 235 respectively formed on two side edges adjacent to the tip 234, the upper plastic sheet film 231 is provided with a first flap 24 attached to the opening 233 thereof, while the lower plastic sheet film 232 is provided with a second flap 25 attached to the opening 233.

Figure 3A:
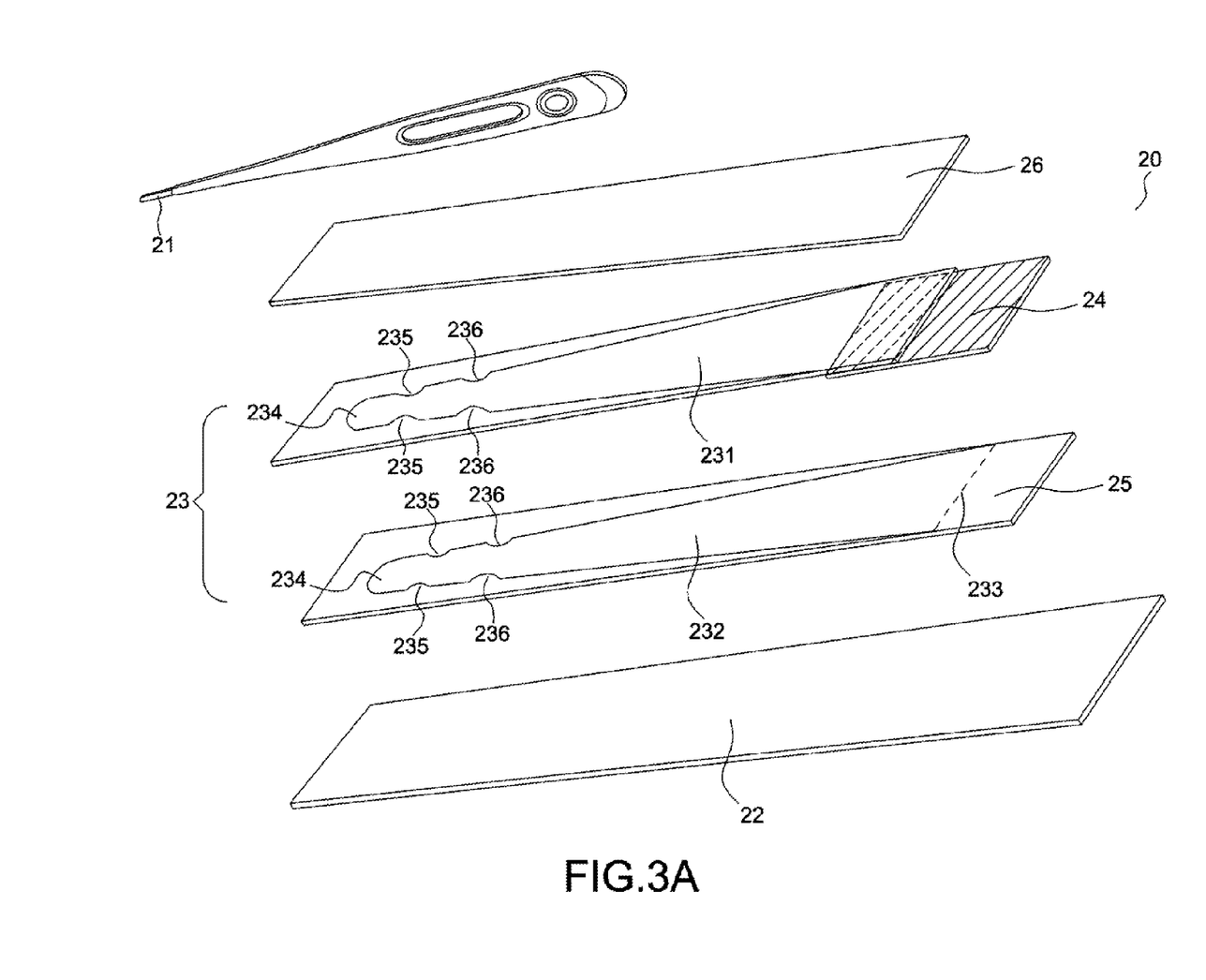
FIG. 3A is an exploded perspective view of a disposable thermometer probe sheath provided with two notches according to another preferred embodiment of the present invention.
Figure 3B:
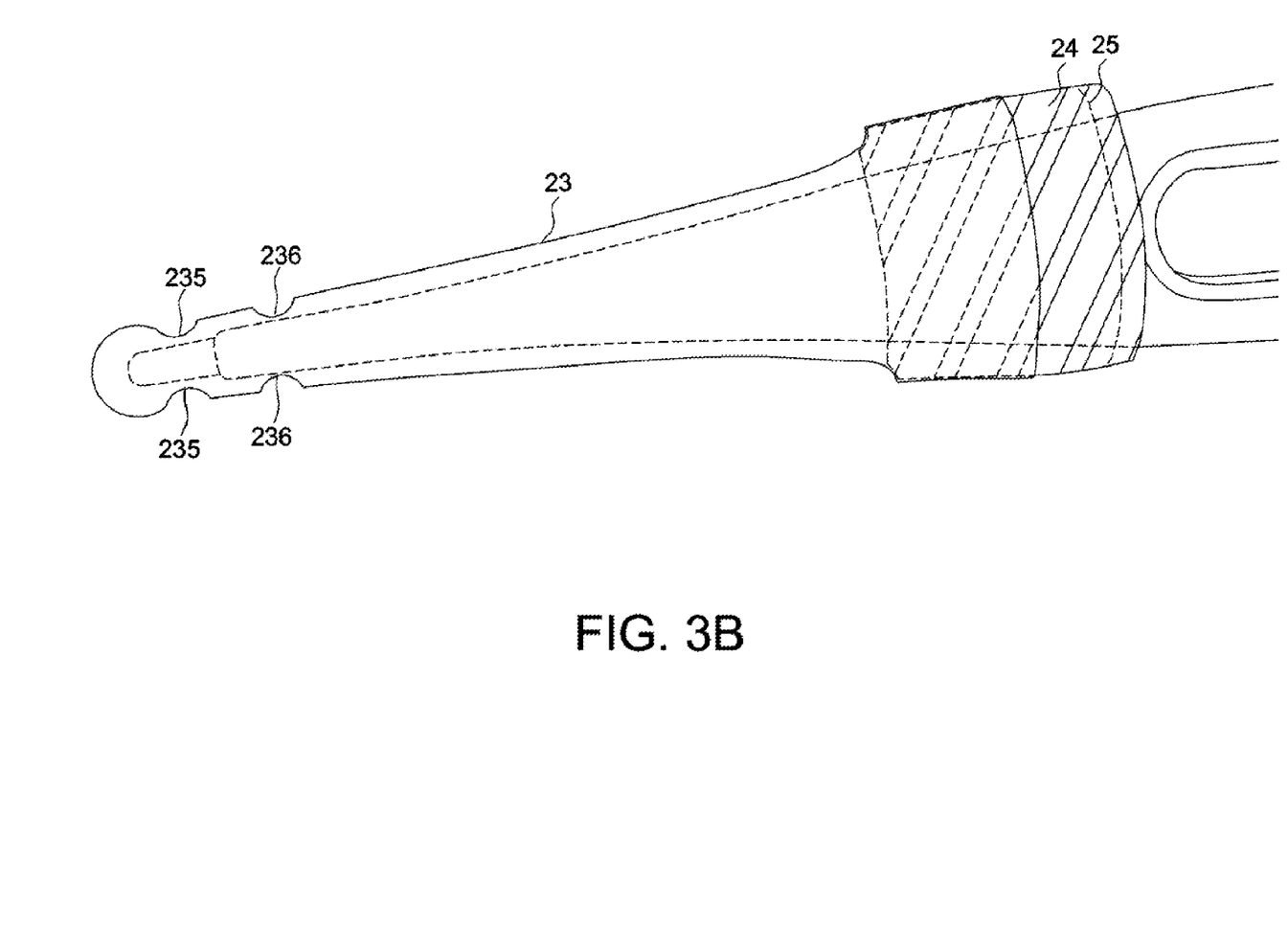
FIG. 3B is an operational view of the disposable thermometer probe sheath provided with the two notches engaged with a thermometer probe according to the preferred embodiment of the present invention.

Furthermore, due to the plastic deformability of the material of the plastic cover film 23, the two notches 235 respectively formed on the two side edges of the plastic cover film 23 can make the thermometer probe 21 being tightly engaged with the plastic cover film 23, so as to prevent the thermometer probe 21 from being detached from the plastic cover film 23. The shape of the two notches 235 is preferably selected from a V shape, a square shape, or an arc-type shape. The shape of the tip 234 of the plastic cover film 23 is preferably selected from a trapezoidal shape tapered toward the rear end thereof, a rectangular shape, or an arc-type shape, all of which are corresponding to the shape of the two notches 235 for being tightly engaged with the thermometer probe 21, wherein the arc-type shape of the tip 234 is formed in the rear end of the plastic cover film 23 beyond the two notches 235. Referring now to FIG. 3A, in an alternative preferred embodiment of the present invention, the plastic cover film 23 is provided with two first notches 235 and two second notches 236 respectively formed on two side edges adjacent to the tip 234 in turn, wherein the two second notches 236 is used to enhance the tightness for contacting the plastic cover film 23 with the thermometer probe 21, as shown in FIG. 3B.

Moreover, each of the upper plastic sheet film 231 and the lower plastic sheet film 232 of the plastic cover film 23 is a thin transparent film, respectively which is made of flexible, deformable and nonfragile material, such as low density polyethylene (LDPE), linear low density polyethylene (LLDPE), or ultra low density polyethylene (ULDPE), which provides a higher flexibility, a higher deformability, and a higher nonfragile property than that of conventional plastic sheet film. After the thermometer probe 21 is used to detect one's body temperature, the thermometer probe 21 will be separated from the plastic cover film 23. At this time, a user can exert a force on the one of the first flap 24 and the second flap 25 along a longitudinal direction of the plastic cover film 23 such that the plastic sheet film 23 will be plastically deformed and overturned from the opening 233 toward the tip 234 of the plastic cover film 23 so as to separate the plastic cover film 23 from the thermometer probe 21. As a result, two outer surfaces of the upper plastic sheet film 231 and the lower plastic sheet film 232 of the plastic cover film 23, which are in contact with one's body, will be overturned and faced toward each other in an overturned status, so as to efficiently lower the contamination risk of users and medical staff caused by contacting with the outer surfaces thereof.

In the first preferred embodiment of the present invention, the first flap 24 and the second flap 25 attached to the opening 233 of the plastic cover film 23 preferably are provided with different colors or dimensions to cause a visual contrast (such as a color contrast or a dimension contrast) to enhance the operation convenience, so that a user can easily identify and operate the first flap 24 and the second flap 25.

Figure 2C:
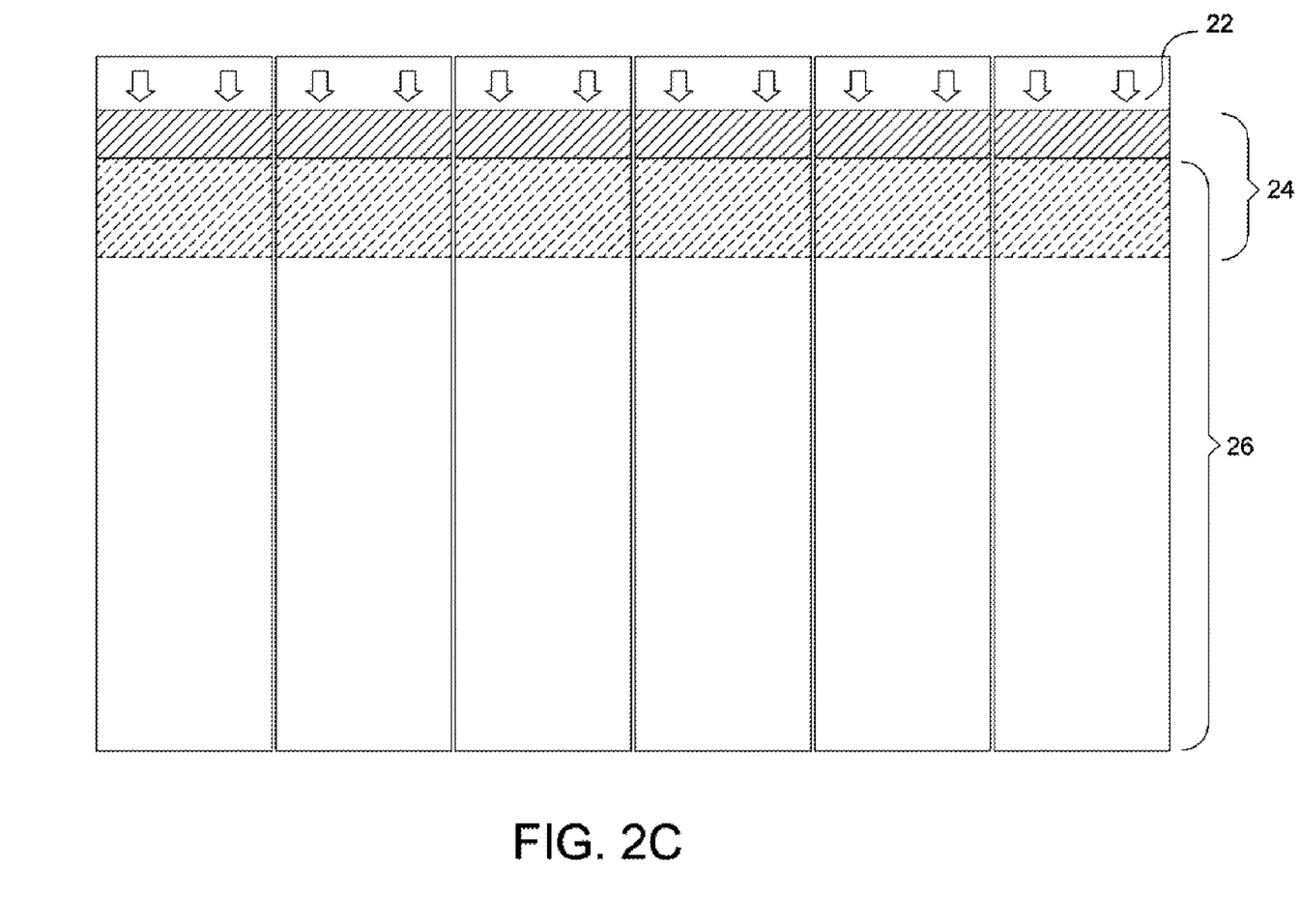
FIG. 2C is a top view of a packaging of the disposable thermometer probe sheath according to the preferred embodiment of the present invention.

On the other hand, in order to conveniently deliver the disposable thermometer probe sheath 20 to customers and to prevent it from being contaminated due to contacting with external objects before use, the present invention further provides a packaging 26 for protecting the disposable thermometer probe sheath 20, as shown in FIG. 2C. The packaging 26 is sealed onto both sides and a bottom end of the bottom piece 22 of the disposable thermometer probe sheath 20, while the packaging 26 is made of a paper sheet having a surface coated with oriented polypropylene (OPP), so that the packaging 26 is easy to be separated from the bottom piece 22 or the plastic cover film 23 (not-shown).

According to a second preferred embodiment of the present invention, a fabrication method of a disposable thermometer probe sheath 20 applied to a thermometer probe 21 comprises the following steps:

(1) Providing a bottom piece 22; and (2) Providing a plastic cover film 23 sealed onto the bottom piece 22.

Referring back to FIG. 2A, in the second preferred embodiment of the present invention, the plastic cover film 23 composed of an upper plastic sheet film 231 and a lower plastic sheet film 232 has on its front edge an opening 233 and on its rear edge a tip 234. In addition, the upper plastic sheet film 231 has its peripheral edge sealed around the peripheral edge of the lower plastic sheet film 232 except for the opening 233 so as to receive a thermometer probe 21 in the plastic cover film 23, as shown in FIG. 2B. An inner surface of the plastic cover film 23 is preferably coated with an ointment, so that the thermometer probe 21 can be smoothly inserted into the plastic cover film 23. Especially, the plastic cover film 23 is provided with two notches 235 respectively formed on two side edges adjacent to the tip 234, the upper plastic sheet film 231 is provided with a first flap 24 attached to the opening 233 thereof, while the lower plastic sheet film 232 is provided with a second flap 25 attached to the opening 233.

Furthermore, due to the plastic deformability of the material of the plastic cover film 23, the two notches 235 respectively formed on the two side edges of the plastic cover film 23 can make the thermometer probe 21 being tightly engaged with the plastic cover film 23, so as to prevent the thermometer probe 21 from being detached from the plastic cover film 23. The shape of the two notches 235 is preferably selected from a V-shaped shape, a square shape, or an arc-type shape. The shape of the tip 234 of the plastic cover film 23 is preferably selected from a trapezoidal shape tapered toward the rear end thereof, a rectangular shape, or an arc-type shape, all of which are corresponding to the shape of the two notches 235 for being tightly engaged with the thermometer probe 21, wherein the arc-type shape of the tip 234 is formed in the rear end of the plastic cover film 23 beyond the two notches 235. Referring now to FIG. 3A, in an alternative preferred embodiment of the present invention, the plastic cover film 23 is provided with two first notches 235 and two second notches 236 respectively formed on two side edges adjacent to the tip 234 in turn, wherein the two second notches 236 is used to enhance the tightness for contacting the plastic cover film 23 with the thermometer probe 21, as shown in FIG. 3B.

Moreover, each of the upper plastic sheet film 231 and the lower plastic sheet film 232 of the plastic cover film 23 is a thin transparent film, respectively which is made of flexible, deformable, and nonfragile material, such as low density polyethylene (LDPE), linear low density polyethylene (LLDPE), or ultra low density polyethylene (ULDPE), which provides a higher flexibility, a higher deformability, and a higher nonfragile property than that of conventional plastic sheet film. After the thermometer probe 21 is used to detect one's body temperature, the thermometer probe 21 will be separated from the plastic cover film 23. At this time, a user can exert a force on one of the first flap 24 and the second flap 25 along a longitudinal direction of the plastic cover film 23 such that the plastic sheet film 23 will be plastically deformed and overturned from the opening 233 toward the tip 234 of the plastic cover film 23 so as to separate the plastic cover film 23 from the thermometer probe 21. As a result, two outer surfaces of the upper plastic sheet film 231 and the lower plastic sheet film 232 of the plastic cover film 23, which are in contact with one's body, will be overturned and faced toward each other in an overturned status, so as to efficiently lower the contamination risk of users and medical staff caused by contacting with the outer surfaces thereof.

In the second preferred embodiment of the present invention, the first flap 24 and the second flap 25 attached to the opening 233 of the plastic cover film 23 preferably are provided with different colors or dimensions to cause a visual contrast (such as a color contrast or a dimension contrast) to enhance the operation convenience, so that a user can easily identify and operate the first flap 24 and the second flap 25.

On the other hand, in order to conveniently output the disposable thermometer probe sheath 20 to customers and to prevent it from being contaminated due to contacting with external objects before use, the present invention further provides a packaging 26 for protecting the disposable thermometer probe sheath 20, as shown in FIG. 2C. The packaging 26 is sealed onto both sides and a bottom end of the bottom piece 22 of the disposable thermometer probe sheath 20, while the packaging 26 is made of a paper sheet having a surface applied with oriented polypropylene (OPP), so that the packaging 26 is easy to be separated from the bottom piece 22 or the plastic cover film 23 (not-shown).

According to a third preferred embodiment of the present invention, a fabrication method of a disposable thermometer probe sheath 20 applied to a thermometer probe 21 comprises the following steps:

(1) Continuously providing a bottom piece 22 by an automatic equipment; and (2) Continuously providing a plastic cover film 23 sealed onto the bottom piece 22 by an automatic production equipment so as to produce the disposable thermometer probe sheath 20 in a continuous strip form.

In the third preferred embodiment of the present invention, the disposable thermometer probe sheath 20 is automatically manufactured to carry out a continuous batch and volume production, wherein a fabrication method for each of the disposable thermometer probe sheath 20 is the same as that of the second preferred embodiment of the present invention.

According to a fourth preferred embodiment of the present invention, a disposable thermometer probe sheath 20 applied to a thermometer probe 21 comprises a plastic cover film 23, but a bottom piece 22 is further omitted, wherein the plastic cover film 23 is composed of an upper plastic sheet film 231 and a lower plastic sheet film 232, both of which are made of flexible, deformable, and nonfragile material, such as low density polyethylene (LDPE), linear low density polyethylene (LLDPE), or ultra low density polyethylene (ULDPE), which provides a higher flexibility, a higher deformability, and a higher nonfragile property than that of conventional plastic sheet film. Other features of the disposable thermometer probe sheath 20 are the same as that of the first preferred embodiment of the present invention.

According to a fifth preferred embodiment of the present invention, a disposable thermometer probe sheath 20 applied to a thermometer probe 21 comprises a bottom piece 22 and a plastic cover film 23 which is sealed onto the bottom piece 22, wherein the plastic cover film 23 is composed of an upper plastic sheet film 231 and a lower plastic sheet film 232 has on its front edge an opening 233. Especially, the upper plastic sheet film 231 is provided with a first flap 24 attached to the opening 233 thereof, but the lower plastic sheet film 232 is not provided with any flap attached to the opening 233 thereof. In addition, the first flap 24 and the bottom piece 22 preferably are provided with different colors (such as one is blue and the other is white) to cause a visual contrast (such as a color contrast) to enhance the operation convenience, so that a user can easily identify and operate the first flap 24. Other features of the disposable thermometer probe sheath 20 are the same as that of the first preferred embodiment of the present invention.

According to a sixth preferred embodiment of the present invention, a fabrication method of a disposable thermometer probe sheath 20 applied to a thermometer probe 21 is disclosed, wherein the structural features of the disposable thermometer probe sheath 20 are the same as that of the fifth preferred embodiment of the present invention, while the fabrication features thereof are the same as that of the second preferred embodiment of the present invention.

According to a seventh preferred embodiment of the present invention, a fabrication method of a disposable thermometer probe sheath 20 applied to a thermometer probe 21 is disclosed, wherein the structural features of the disposable thermometer probe sheath 20 are the same as that of the fifth preferred embodiment of the present invention, while the fabrication features thereof are the same as that of the third preferred embodiment of the present invention.

According to an eighth preferred embodiment of the present invention, a disposable thermometer probe sheath 20 applied to a thermometer probe 21 comprises a plastic cover film 23, wherein the plastic cover film 23 is composed of an upper plastic sheet film 231 and a lower plastic sheet film 232, both of which are made of flexible, deformable, and nonfragile material, such as low density polyethylene (LDPE), linear low density polyethylene (LLDPE), or ultra low density polyethylene (ULDPE), which provides a higher flexibility, a higher deformability, and a higher nonfragile property than that of conventional plastic sheet film. Furthermore, the plastic cover film 23 has on its front edge an opening 233 and the upper plastic sheet film 231 is provided with a first flap 24 attached to the opening 233 thereof, but the lower plastic sheet film 232 is not provided with any flap attached to the opening 233 thereof. In addition, other features of the disposable thermometer probe sheath 20 are the same as that of the fourth preferred embodiment of the present invention.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A fabrication method of a disposable thermometer probe sheath, comprising:
    continuously providing a bottom piece; and
    continuously providing a plastic cover film sealed onto the bottom piece so as to produce the disposable thermometer probe sheath in a continuous strip form, wherein the plastic cover film having an upper plastic sheet film and a lower plastic sheet film has an opening on its front edge and a tip on its rear edge; the upper plastic sheet film having its peripheral edge sealed around the peripheral edge of the lower plastic sheet film except for the opening so as to receive a thermometer probe in the plastic cover film; characterized in that:
    the plastic cover film is made of a flexible and deformable material and it is provided with two notches respectively formed on two side edges adjacent to the tip such that the notches are plastically deformed and tightly engaged with the thermometer probe when the thermometer probe is inserted into the plastic cover film; and the plastic cover film is plastically deformed and overturned from its opening toward its tip such that its upper plastic sheet film's outer surface and its lower plastic film's outer surface are overturned to face each other while a force is exerted on the opening along a longitudinal direction of the plastic cover film, when the thermometer probe is separated from the plastic cover film.

2. A fabrication method of a disposable thermometer probe sheath, comprising:
    continuously providing a bottom piece; and
    continuously providing a plastic cover film sealed onto the bottom piece so as to produce the disposable thermometer probe sheath in a continuous strip form, wherein the plastic cover film having an upper plastic sheet film and a lower plastic sheet film has an opening on its front edge and a tip on its rear edge; the upper plastic sheet film having its peripheral edge sealed around the peripheral edge of the lower plastic sheet film except for the opening so as to receive a thermometer probe in the plastic cover film; characterized in that:
    the plastic cover film is made of a flexible and deformable material and it is provided with two notches respectively formed on two side edges adjacent to the tip such that the notches are plastically deformed and tightly engaged with the thermometer probe when the thermometer probe is inserted into the plastic cover film; and the plastic cover film is plastically deformed and overturned from its opening toward its tip while a force is exerted on the opening along a longitudinal direction of the plastic cover film, when the thermometer probe is separated from the plastic cover film, wherein the upper plastic sheet film is provided with a first flap attached to the opening and the lower plastic sheet film is provided with a second flap attached to the opening, respectively.

3. The fabrication method of a disposable thermometer probe sheath of claim 2, wherein the first flap and the second flap are provided with different colors to cause a color contrast.

4. The fabrication method of a disposable thermometer probe sheath of claim 2, wherein the first flap and the second flap are provided with different sizes.

5. The fabrication method of a disposable thermometer probe sheath of claim 1, further comprising a packaging sealed onto both sides and a bottom end of the bottom piece.

6. The fabrication method of a disposable thermometer probe sheath of claim 1, wherein the plastic cover film is made of a material selected from one of the group consisting of low density polyethylene (LDPE), linear low density polyethylene (LLDPE), and ultra low density polyethylene (ULDPE).

7. The fabrication method of a disposable thermometer probe sheath of claim 5, wherein the packaging is a paper sheet.

8. The fabrication method of a disposable thermometer probe sheath of claim 7, wherein the paper sheet is coated with an oriented polypropylene (OPP).

* * * * *